United States Patent [19]

Wellington et al.

[11] Patent Number: 5,327,288
[45] Date of Patent: Jul. 5, 1994

[54] REDUCED VIBRATION DAY/NIGHT REARVIEW MIRROR ASSEMBLY

[75] Inventors: James M. Wellington, Holland; Craig M. Miller, Jenison; Edward R. Adams, Spring Lake, all of Mich.

[73] Assignee: Donnelly Corporation, Holland, Mich.

[21] Appl. No.: 759,899

[22] Filed: Sep. 13, 1991

[51] Int. Cl.$^5$ .............................................. G02B 5/08
[52] U.S. Cl. .................................. 359/606; 359/605; 359/604; 359/603; 359/602; 359/872; 248/479; 248/483; 248/484
[58] Field of Search ............... 359/602, 603, 604, 605, 359/606, 872; 248/479, 480, 481, 483, 484

[56] References Cited

U.S. PATENT DOCUMENTS

| | | |
|---|---|---|
| 1,919,475 | 7/1933 | McKinley . |
| 2,052,880 | 9/1936 | Hofer . |
| 2,356,432 | 8/1944 | Roedding . |

(List continued on next page.)

FOREIGN PATENT DOCUMENTS

| | | |
|---|---|---|
| 137412 | 10/1947 | Australia . |
| 0057154 | 8/1982 | European Pat. Off. . |
| 1203145 | 10/1965 | Fed. Rep. of Germany . |
| 1237454 | 3/1967 | Fed. Rep. of Germany . |
| 2165226 | 7/1973 | Fed. Rep. of Germany . |
| 1780669 | 10/1973 | Fed. Rep. of Germany . |
| 2226481 | 12/1973 | Fed. Rep. of Germany . |
| 2406381 | 8/1975 | Fed. Rep. of Germany . |
| 1000125 | 3/1956 | France . |
| 1123827 | 9/1956 | France . |
| 1295152 | 6/1962 | France . |
| 1536444 | 8/1968 | France . |
| 1562864 | 4/1969 | France . |
| 44139 | 8/1981 | Ireland . |
| 59431 | 5/1977 | Japan . |
| 750848 | 6/1956 | United Kingdom . |
| 1120517 | 7/1968 | United Kingdom . |
| 1188007 | 4/1970 | United Kingdom . |
| 1227736 | 4/1971 | United Kingdom . |
| 1228742 | 4/1971 | United Kingdom . |
| 1235466 | 6/1971 | United Kingdom . |
| 1274210 | 5/1972 | United Kingdom . |
| 1363070 | 8/1974 | United Kingdom . |

OTHER PUBLICATIONS

Exhibit A–photograph of Datsun 1978 510 rearview mirror used in the United States.

(List continued on next page.)

Primary Examiner—Loha Ben
Assistant Examiner—Thomas Robbins
Attorney, Agent, or Firm—Price, Heneveld, Cooper, DeWitt & Litton

[57] ABSTRACT

A reduced vibration day/night rearview mirror assembly provides improved stability of the mirror assembly. The assembly preferably includes a molded mirror case, a prismatic mirror element, and a two piece actuator assembly which provides reduced vibratory movement between a mirror mounting bracket and the mirror assembly. The actuator assembly includes a toggle member and a pivot lever which pivotally interconnect. The toggle member has a pivot journal defined along at least a portion of a first side and has a pivot surface defined along at least a portion of a second, opposing side. The pivot lever has a pivot shaft for pivotally mounting the lever in the mirror case and has an opensided pivot channel generally parallel to and spaced from the pivot shaft for receiving and pivotally engaging the pivot surface of the toggle member. The case has cooperating supports for receiving the pivot lever pivot shaft and a pivot axle for engaging the toggle member pivot journal. In one aspect of the invention, the pivot axle is noncircular in cross section and is preferably generally square. In another aspect of the invention, the pivot journal is a slightly tapered, open-sided channel having a noncircular cross section and is preferably wider across the open side than at an opposing side.

42 Claims, 4 Drawing Sheets

U.S. PATENT DOCUMENTS

| | | |
|---|---|---|
| 2,420,259 | 5/1947 | McNamara . |
| 2,469,207 | 5/1949 | Roedding . |
| 2,502,699 | 4/1950 | Budreck . |
| 2,640,394 | 6/1953 | Bertell et al. . |
| 2,669,159 | 2/1954 | Rogers . |
| 2,691,919 | 10/1954 | Springer . |
| 2,722,159 | 11/1955 | Budreck . |
| 2,838,979 | 6/1958 | Meade . |
| 2,839,964 | 6/1958 | Ponce . |
| 2,843,017 | 7/1958 | Ponce . |
| 2,900,872 | 8/1959 | Mazur et al. . |
| 2,913,958 | 11/1959 | Mead et ai. . |
| 2,964,999 | 12/1960 | Mazur . |
| 2,993,410 | 7/1961 | Bertell et al. . |
| 2,995,982 | 8/1961 | Scheitlin et al. . |
| 3,026,771 | 3/1962 | Knowlton et al. . |
| 3,029,701 | 4/1962 | Nelson . |
| 3,253,510 | 5/1966 | Clayton . |
| 3,279,315 | 10/1966 | Albers . |
| 3,427,094 | 2/1969 | Scheitlin et al. . |
| 3,439,977 | 4/1969 | Meade . |
| 3,451,746 | 6/1969 | Madge . |
| 3,463,576 | 8/1969 | Church . |
| 3,472,580 | 10/1969 | Janosky . |
| 3,507,562 | 4/1970 | Yamashita et al. . |
| 3,522,987 | 8/1970 | Janosky et al. . |
| 3,525,564 | 8/1970 | Barton . |
| 3,586,422 | 6/1971 | Kagami . |
| 3,680,951 | 8/1972 | Jordan et al. . |
| 3,870,404 | 3/1975 | Wilson et al. . |
| 3,918,799 | 11/1975 | Kurz, Jr. et al. . |
| 4,281,898 | 8/1981 | Ochiai et al. . |
| 4,319,806 | 3/1982 | Brandenberg . |
| 4,436,371 | 3/1984 | Wood et al. . |
| 4,527,861 | 7/1985 | Van Duyn . |
| 4,826,289 | 5/1989 | Vandenbrink et al. . |
| 4,836,648 | 6/1989 | Niwayama ............ 359/606 |
| 4,995,581 | 2/1991 | Koiwai et al. ............ 248/549 |

OTHER PUBLICATIONS

Exhibit B–photograph of BMW rearview mirror.

Exhibit C–photograph of Honda rearview mirror.

Exhibit D–photograph of another BMW rearview mirror.

Exhibit E–photograph of Mercedes rearview mirror.

Exhibit F–photograph of Metagal (Brazil) rearview mirror.

Exhibit G–photograph of another Metagal rearview mirror.

Exhibit H–photograph of Siegel-Robert Rearview mirror.

Exhibits I-K–drawings of Toyota Motor Corporation inner rearview mirror assembly and parts, Part No. 87816–002DL, 1983.

REDUCED VIBRATION DAY/NIGHT REARVIEW MIRROR ASSEMBLY

BACKGROUND OF THE INVENTION

The present invention relates to day/night rearview mirror assemblies which have a high reflectivity day position and a reduced reflectivity night position, wherein reflection of undesired and distracting glare from behind a vehicle is reduced or eliminated in the night position, and more particularly, to an improved day/night rearview mirror assembly in which vibration of the mirror assembly is reduced.

Conventional day/night rearview mirrors employ a variety of systems to control movement between high and low reflectivity positions. Such assemblies normally include a toggle member or other actuator pivotally mounted in a rearview mirror case and a prismatic mirror element mounted to define a front face of the mirror assembly. In many prior known structures, a cam or overcenter type lever operator is used to pivot the case and prism with respect to the toggle. In turn, the toggle is commonly mounted on a ball joint or other mounting support which extends to a fixed member of a vehicle.

The toggle member may commonly be mounted to the case by a cylindrical shaft, supported in the case and extending through the toggle or by cylindrical stub shafts extending between the case and opposing sides of the toggle. The stub shafts may be fixed to the case with the toggle pivoting upon the stub shafts. Alternately, the stub shafts may be fixed to the toggle and pivot in supports formed in the case, or the stub shafts may be loose to pivot with respect to each of the toggle and the case. With any of these prior arrangements, the shaft means used is commonly cylindrical and offers no or little resistance to rotation of the toggle relative to the case.

Thus, in spite of whatever type of actuator is used to position the mirror assembly in the day or night positions, typically in an over center or toggle lever arrangement, some rotational movement between the toggle and the case will be allowed by the actuator. In addition, the wide spacing of the cylindrical or stub shafts on either side of the toggle can also lead to vibration. The combination of these actions will typically manifest as a relatively high frequency, low amplitude vibration of the mirror case and element, resulting in a blurred view through the mirror.

As a practical concern, the actuator must be relatively easily moveable between the day and night positions for convenient use of the mirror. However, the actuator may be made overly firm in an attempt to suppress vibration. In such a case, the actuator may so securely hold the mirror in one position, that a greater force is required to manipulate the actuator than is required to adjust the gross positioning of the mirror. This situation is quite likely to frustrate a user with the result that the day/night feature will not be used and the mirror will inappropriately be left in one position. This will in turn compromise a user's driving by reflecting glare at night or by reduced reflectivity during day.

Many prior known rearview mirror assemblies have also been unable to meet required standards for resistance to impact and bending as set by various countries or organizations such as the European Economic Community (EEC). Consequently, in order to enable use of a rearview mirror assembly on a world wide basis, it is necessary that a rearview mirror assembly meet or exceed such requirements for both impact and bending. The EEC standards provide that an assembly must resist breakage or scattering of broken glass when the mirror element is struck with a swinging pendulum having a rigid spherical weight of approximately 6.8 kilograms, for example. The assembly must also support a weight of 50 kilograms on its lower edge without breaking when supported horizontally with its rear support extending downwardly.

In addition to the above concerns, market pressures are present for reducing cost and minimizing component assembly weight as a part of continued emphasis on improved vehicle efficiency and economy.

SUMMARY OF THE INVENTION

Accordingly, the present invention provides a manually operated day/night rearview mirror assembly which may be positioned in a substantially full reflectivity day position and in a reduced reflectivity night position to reduce or eliminate reflection of unwanted glare. The assembly is both rigid and light weight and includes a mirror case with mounting supports and a pivot axle for receiving and mounting an actuator in the case. A prismatic mirror element having nonparallel and generally planar front and back surfaces is mounted in the case. An actuator for shifting the case and mirror element between a predetermined reflectivity day position and a reduced reflectivity night position is provided, the actuator having a pivot journal for pivotally engaging the pivot axle. In one aspect of the invention, the pivot axle is noncircular. Further, the pivot axle is preferably generally square in cross section. In another aspect of the invention, the pivot journal is noncircular in cross section. In yet another aspect of the invention, the pivot journal defines an open-sided channel. Further, the pivot journal preferably has a slightly tapered cross-sectional shape with the open side being wider than the side opposite thereto.

The pivot axle may be defined by a top edge of a mounting aperture through the back of the mirror case, the mirror mount extending through the mounting aperture from the actuator to a fixed member of a vehicle. Thus, the pivot axle may be easily formed as a rigid structural member of a molded mirror case. This combination of pivot axle and journal reduces vibration in the assembly and enhances the capability of the assembly to meet various regulatory requirements while allowing a simple, light weight, and cost effective product for a manufacturer.

These and other objects, advantages and features of the present invention will become apparent upon review of the following specification in conjunction with the drawings.

DESCRIPTION OF THE PREFERRED EMBODIMENTS

Figure 1:
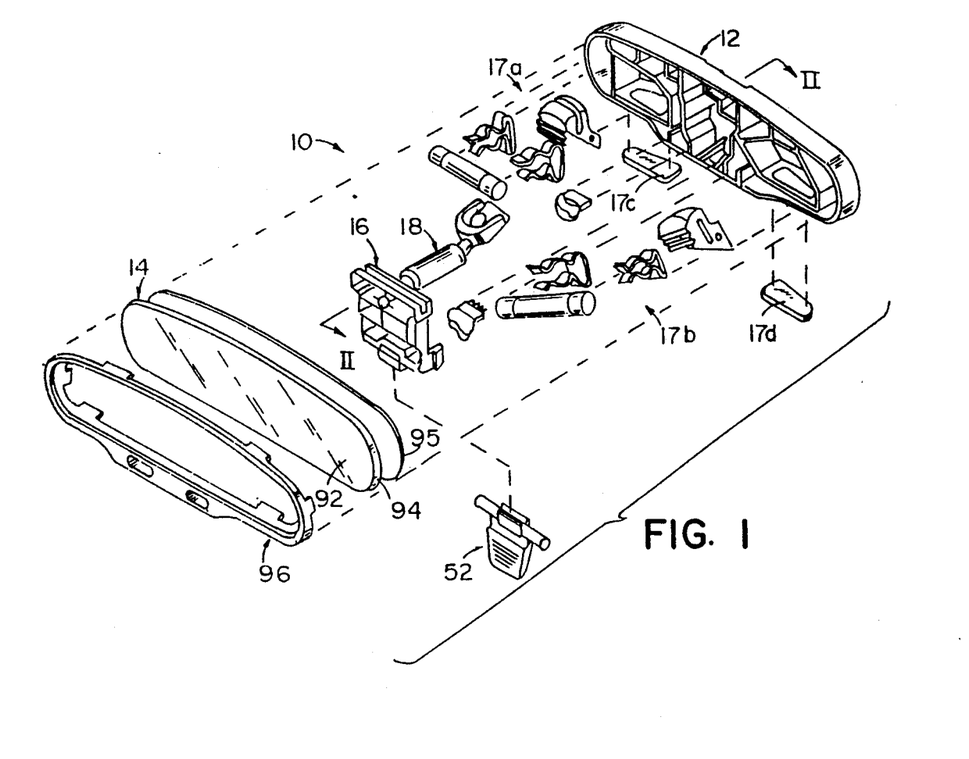
FIG. 1 is an exploded perspective view of a mirror assembly according to the present invention.
Figure 2:
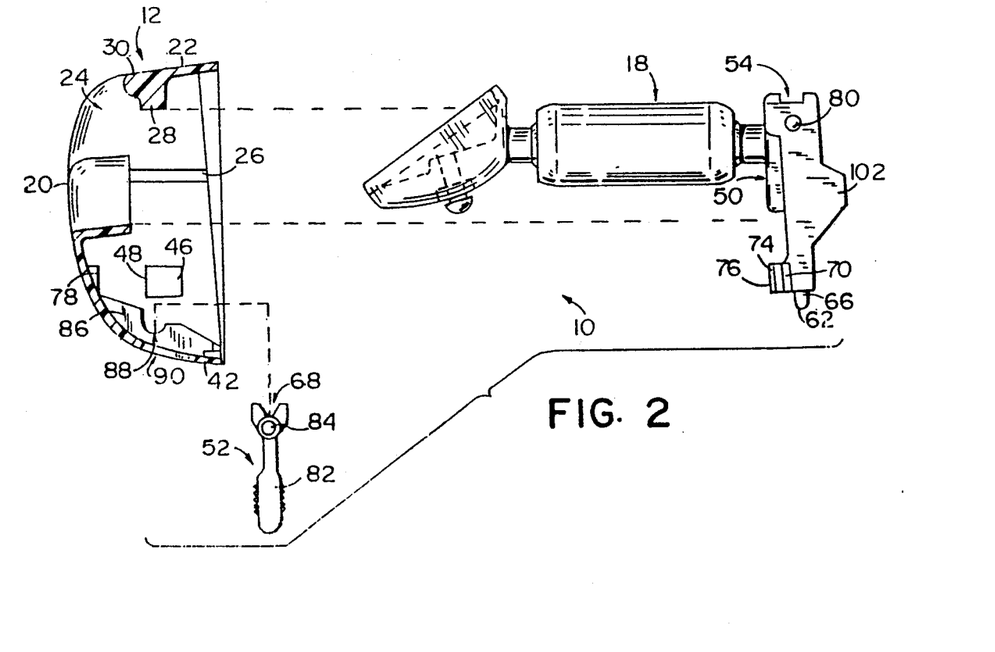
FIG. 2 is an exploded cross-sectional view of the mirror of FIG. 1, along section plane II—II.
Figure 3:
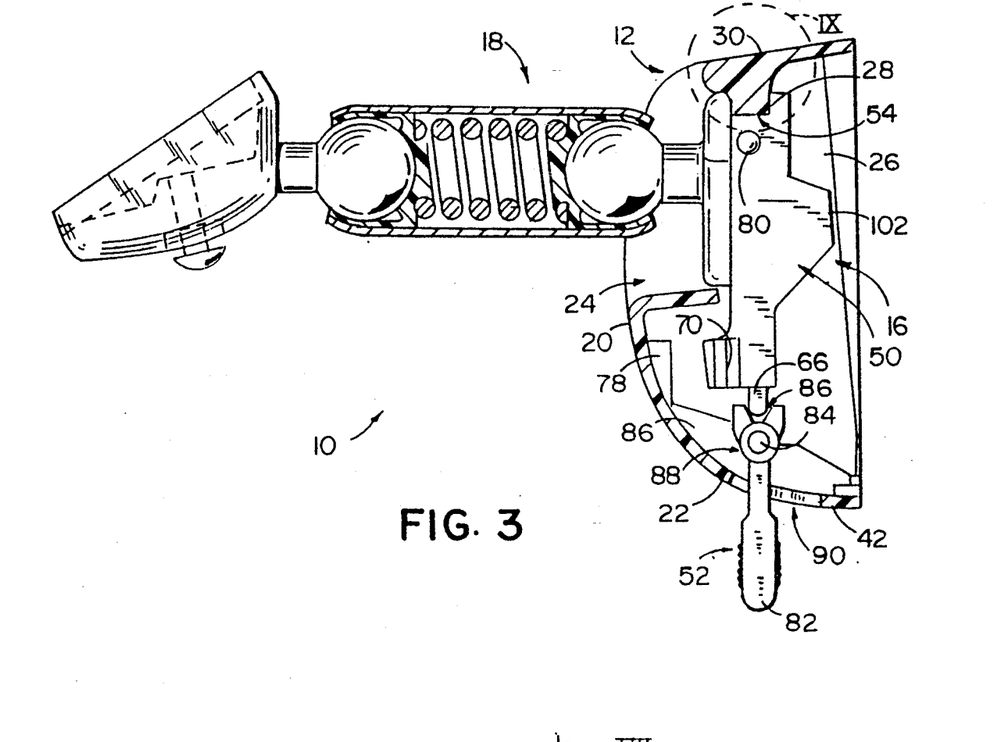
FIG. 3 is an assembled view of the view of FIG. 2.

Referring to the drawings in greater detail, a day/night rearview mirror assembly 10 according to the present invention is generally shown in FIGS. 1-9 and includes a case 12, a prismatic mirror element 14, and an actuator 16. Case 12 is preferably of the lighted type having two light assemblies 17a, 17b mounted on either side of actuator 16 as shown in FIG. 1. Lenses 17c, 17d close openings in the bottom of the mirror case. Mirror assembly 10 is preferably mounted to a vehicle by a pivotal, double ball joint mounting arm 18 which extends between actuator 16 and a fixed member of the vehicle (FIGS. 1-3). Mounting arm 18 is preferably a break away support arm which may be of various commonly known types. Mounting arm 18 forms no part of the present invention.

Figure 4:
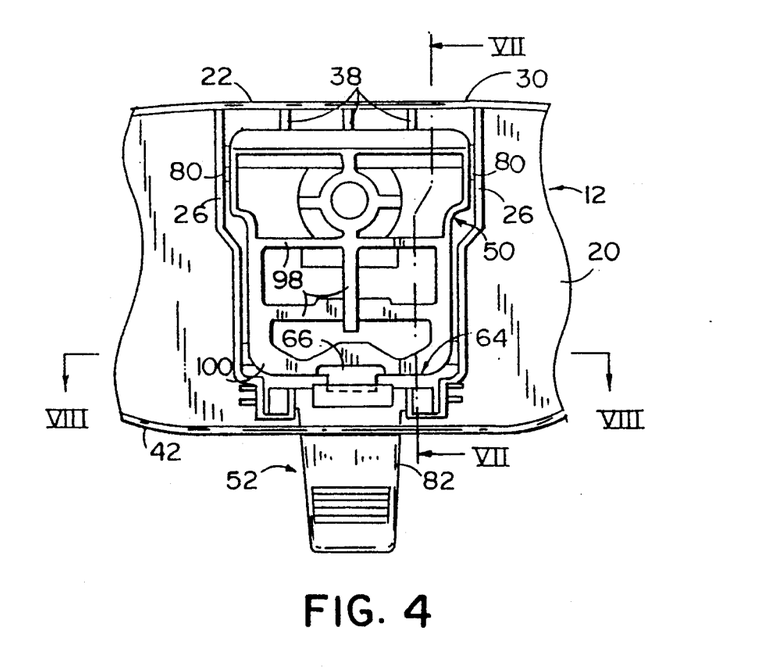
FIG. 4 is a fragmentary front elevational view of the mirror assembly of FIG. 3.
Figure 9:
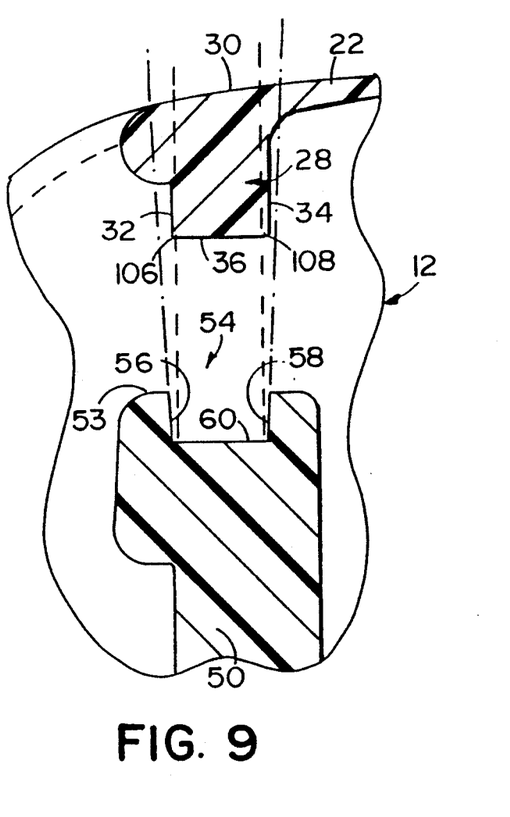
FIG. 9 is an enlarged, exploded view of detail IX of FIG. 3.

Case 12 is a shell of generally hollow construction and is preferably molded from a thermoplastic material, such as 13% glass filled nylon (FIGS. 1-3). Case 12 has a back wall 20 with a perimeter side wall 22, a length greater than its width, and a mounting aperture 24, generally centered along the case length, in back wall 20. Mounting arm 18 extends through mounting aperture 24 for mounting mirror assembly 10 to the vehicle. Mounting aperture 24 has two opposing sides which are partially defined by a pair of structural webs 26 (FIG. 4). Structural webs 26 extend across the width of case 12, inside the case, between opposing portions of side wall 22. Mounting aperture 24 has a top edge which is defined by a pivot axle 28 for receiving actuator 16 (FIGS. 2, 3, and 9). Pivot axle 28 is positioned adjacent a top portion 30 of side wall 22 and enhances the strength of case 12, especially in and around aperture 24.

Figure 7:
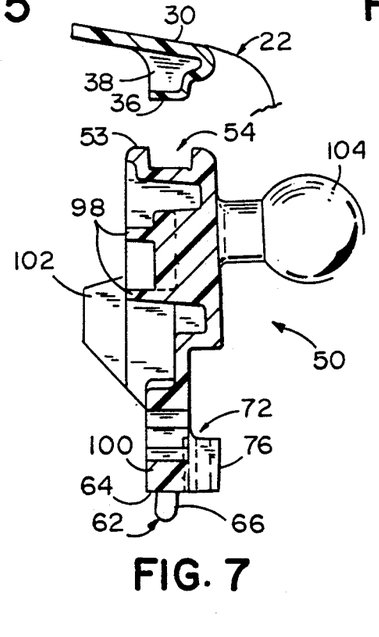
FIG. 7 is a fragmentary exploded sectional view along plane VII—VII of FIG. 4.

Pivot axle 28 is a noncircular member, preferably having a generally trapezoidal cross section with right angle corners 106,108 as seen in FIG. 9. Pivot axle 28 is defined by a pair of generally parallel and spaced surfaces 32 and 34 which extend generally upward in FIG. 9, away from actuator 16, from opposing edges of a third surface or bight portion 36. As seen in FIGS. 4 and 7, although the pivot axle may comprise a bar extending along and across top portion 30 of side wall 22 and including surfaces 32, 34 and 36, surface 34 is not required to be a solid surface and may be defined by a series of webs 38 extending between bight portion 36 and top portion 30 of side wall 22.

Figure 8:
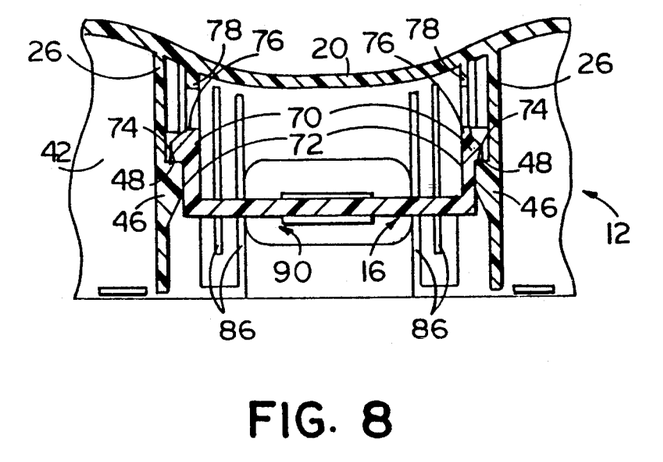
FIG. 8 is a fragmentary plan view along plane VIII—VIII of FIG. 4.

A pair of wedge-shaped stops 46 are formed on structural webs 26 near a bottom portion 42 of side wall 22 (FIGS. 2-4, and 8). Stops 46 project toward each other from webs 26 and are oriented so that a line extending from the apex of the wedge to an opposing back surface 48 of the wedge is positioned generally perpendicularly to back wall 20 and so that surface 48 faces back wall 20 with the apex of the wedge extending away from back wall 20 (FIG. 8).

Figure 6:
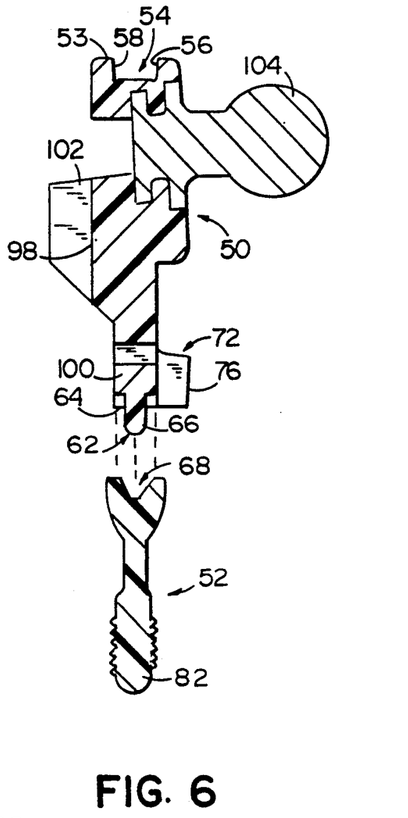
FIG. 6 is a cross-sectional view along plane VI—VI of FIG. 5.

Actuator 16 includes a toggle member 50 and a pivot lever 52, each also preferably molded of a thermoplastic material, such as 13% glass filled nylon (FIGS. 2-4). Toggle 50 has a pivot journal 54 formed along a top edge 53 (FIGS. 2-4 and 9). Journal 54 corresponds to pivot axle 28 and has two surfaces 56 and 58, extending upward as shown in FIGS. 6 and 9 away from actuator 16, from opposing edges of a third surface or bight portion 60 to form an open-sided channel. Surfaces 56 and 58 of journal 54 are most preferably nonparallel and slope away from each other as indicated in FIG. 9 at approximately two degrees from the vertical.

Figure 5:
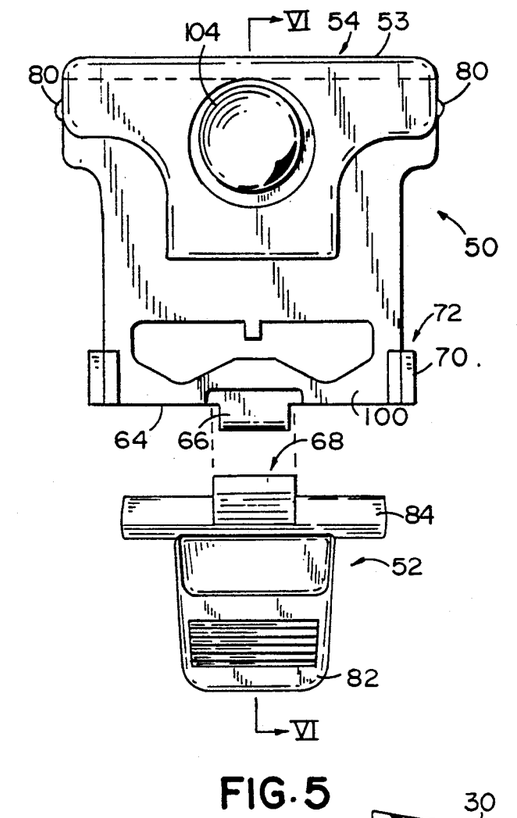
FIG. 5 is an exploded, rear elevational view of the toggle and pivot lever members of the mirror of FIG. 1.

As shown in FIG. 4, toggle 50 has a generally trapezoidal front elevational configuration. Toggle 50 is not a solid thermoplastic member but is preferably molded with a pattern of multiple voids generally defined by interconnecting, interior structural webs 98. A zinc die cast mounting ball 104 is molded into the back of toggle 50 (FIGS. 5-7). Further, a pair of forward projecting stops 102 are molded into toggle 50 and provide additional impact support to mirror element 14 to resist deflection and breakage (FIGS. 2, 3, 6 and 7). Finally, an aperture penetrating toggle 50 near bottom edge 64 defines a spring bar portion 100 (FIGS. 4-7). The interaction of pivot lever 52 with toggle 50 defines an overcenter or toggle linkage for actuating mirror assembly 10. As pivot lever 52 is manipulated from a day position to a night position or vice versa, spring bar 100 deflects to pass over a center position, between the night and day positions. Spring bar 100 remains slightly deflected in each of the day and night positions to exert a force between toggle 50 and pivot lever 52 for biasing actuator 16 toward and holding actuator 16 in one of the day and night positions.

A pivot surface 62 is provided along at least a portion of a bottom edge 64 of toggle 50 (FIGS. 2, 6 and 7). Most preferably, a bottom tab 66 projects generally downward from bottom edge 64 to define rounded, rectilinear pivot surface 62 for engaging a pivot channel 68, provided on pivot lever 52. Bottom edge 64 is preferably defined by a spring bar 100, molded into toggle 50, as discussed above and disclosed in U.S. Pat. No. 3,870,404, entitled MIRROR ACTUATOR AND SUPPORT MEANS THEREFOR, and issued on Mar. 11, 1975, to Wilson et al., and U.S. Pat. No. 3,978,190, entitled EDGE FORMING METHOD FOR MIRROR CASE, and issued on Aug. 31, 1976, to Kurz Jr. et al.

A pair of stops 70 are provided on toggle 50 for cooperating with stops 46 on structural webs 26 to lock actuator 50 in case 12 and to define the day position for actuator 50 (FIGS. 3 and 5-8). Stops 68 are formed on legs 72 of toggle 50, at bottom edge 64. Stops 70 are generally wedge shaped, similar to stops 46, but are oppositely oriented. Thus, toggle 50 may be assembled in case 12 by exploiting the cooperating wedge shape of stops 46 and 70 by forcing stops 70 to cam or wedge over stops 46, temporarily deflecting legs 72 until stops 70 pass stops 46. Thereafter, an abutting surface 74 of stops 70 will abut back surface 48 of stops 46 to preclude the removal of toggle 50 from case 12 and to define the day position of actuator 16. Legs 72 extend beyond stops 70 to terminal ends defining night stops 76. Stops 76 abut a pair of webs 78 which project from case back wall 20, defining the night position of actuator 16.

Toggle 50 is also provided with a pair of lateral positioners 80 which project in generally opposite directions from opposing sides of toggle 50, near journal 54 (FIG. 3). Positioners 80 abut against structural webs 26 to preclude any longitudinal movement between pivot axle 28 and pivot journal 54 and to position journal 54 relative to axle 28.

Pivot lever 52 is a generally planar member having a grasp handle 82 for manipulating lever 52, having pivot channel 68 positioned opposite to handle 82, and having a pivot shaft 84 positioned between channel 68 and handle 82. Channel 68 is generally V-shaped and opens away from handle 82. Channel 68 pivotally engages tab 66 at pivot surface 62 for manipulating toggle 50 and toggling actuator 16 between the day and night positions. Pivot shaft 84 projects in generally opposing directions from opposing sides of lever 52 and is oriented generally parallel to channel 68. Case 12 further includes two pair of webs 86 which are located along bottom portion 42 of side wall 22 and define support bearings 88 for supporting actuator 16 (FIGS. 2, 3 and 8). A pivot lever aperture 90 is also provided in bottom portion 42 of side wall 22 and located between webs 86 so that pivot shaft 84 may be located in support bearings 88 with handle 82 extending through aperture 90 for access of handle 82 by a user.

Prismatic mirror element 14 is preferably a transparent, prismatic element of glass or plastic or the like and has nonparallel front and back surfaces 92 and 94, respectively (FIG. 1). Back surface 94 has a thin layer of reflective material such as metallic silver or chrome or the like and is most preferably covered by a resilient, protective, anti-scattering layer of a resinous material such as polyvinylchloride or the like as is commonly known. Mirror element 14 may have a layer 95 of polyester, closed cell foam (FIG. 1) adhered to back surface 94 by an adhesive carrier layer of polyester film as is disclosed in greater detail in commonly assigned U.S. Pat. No. 5,178,448 entitled REARVIEW MIRROR WITH LIGHTING ASSEMBLY, and issued to Adams et al., Jan. 12, 1993, the disclosure of which is incorporated herein by reference. As taught in the above patent, the adhesive carrier layer may serve the safety antiscatter function when adhered to the back surface 94 of mirror element 14.

Mirror assembly 10 is easily assembled by inserting grasp handle 82 of pivot lever 52 through aperture 90 of case 12 and positioning pivot shaft 84 of pivot lever 52 in support bearings 88 with pivot channel 68 oriented generally away from back wall 20 of case 12. Mounting arm 18 is inserted through mounting aperture 24 of case 12. Pivot journal 54 is aligned with pivot axle 28 and positioned over axle 28. Toggle 50 may then be pivoted about axle 28 so that stops 70 wedge past stops 46 while simultaneously engaging pivot channel 68 of pivot lever 52 with bottom tab 66 of toggle 50. Actuator 16 will thus be irremovably snapped into case 12. Prismatic mirror element 14 may then be mounted to case 12, using a resilient foam pad 95 and a circumscribing bezel 96 as are commonly known and also more completely disclosed in the Adams et al. U.S. Pat. No. 5,178,448 referenced above.

Once assembled, actuator 16 may be manipulated between a day position and a night position by toggling pivot lever 52 back and forth with respect to mirror assembly 10. Pivot lever 52 will thus rotate about pivot shaft 84, in turn causing case 12 and mirror element 14 to pivot about pivot axle 28, by the interaction between pivot channel 68 and pivot surface 62 and the engagement of pivot shaft 84 with bearing surfaces 88. Toggle 50 pivots freely without binding about generally square pivot axle 28, positioned in slightly tapered, but generally trapezoidal pivot journal 54. The use of pivot axle 28 helps to reduce and/or eliminate rotational friction at this joint and helps to yield a crisper feeling actuation for the assembly.

Further, ramping tendencies are minimized in the present invention. With a standard, cylindrical axle and journal, impulse forces in a fore and aft direction may cause a cylindrical axle to ramp up the side of a cylindrical, open channel journal. This is inherent in the geometry of the cross section of the axle and journal interconnection which will translate a portion of a transverse force into a vertical force and lift the axle out of the journal. However, in the present invention, such a geometry does not exist. There is no significantly angled contact point for transferring a transverse force into a vertical force. While walls 56 and 58 of pivot journal 54 are preferably not absolutely parallel, but are angled slightly away from each other, the small amount of angle presented by side walls 56 and 58 allows only a very small amount of forward or rearward force to be transferred into vertical force. For example, at the preferred angling of two degrees between walls 56 and 58, only about three percent or so of a forward or backward force will be transferred into a vertical force.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A day/night rearview mirror assembly for vehicles comprising:
   a mirror case;
   a prismatic mirror element having nonparallel, generally planar front and back surfaces and supported and retained in said mirror case;
   actuator means mounted within said mirror case for shifting said mirror case and mirror element between a predetermined reflectivity day position and a reduced reflectivity night position, said actuator means including generally parallel pivot journal means and pivot shaft means for pivotally supporting said actuator means in said mirror case, said pivot journal means defining an open-sided channel extending across a width of said actuator means at a position spaced from said pivot shaft means; and
   said mirror case including support means for receiving said pivot shaft means and including cooperating pivot axle means corresponding to said pivot journal means for pivotally engaging said pivot journal means, said pivot axle means have a surface engaging said pivot journal means, said surface being noncircular in cross section.

2. The assembly defined in claim 1 wherein said pivot axle means has a first generally planar surface and has a second generally planar surface.

3. The assembly defined in claim 2 wherein said pivot axle means further has a third surface; said first and second surfaces being generally parallel and extending in the same general direction, away from said actuator means, from opposing edges of said third surface.

4. The assembly defined in claim 3 further including mounting means connected with said actuator means for mounting said mirror assembly to a vehicle and wherein said case has a back with a mounting aperture defined therein, said mounting means extending from said actuator means, through said mounting aperture, and out of said case.

5. The assembly defined in claim 4 wherein said mounting aperture has a top edge, said top edge including said pivot axle means.

6. The assembly defined in claim 1 wherein said pivot journal means is noncircular.

7. The assembly of claim 1 wherein said actuator means includes stop means for engaging a portion of said mirror case to position said mirror case and mirror element in each of said day position and said night position.

8. A day/night rearview mirror assembly for vehicles comprising:
   a mirror case;
   a prismatic mirror element having nonparallel, generally planar front and back surfaces and supported and retained in said mirror case;
   actuator means mounted within said mirror case for shifting said mirror case and said mirror element between a predetermined reflectivity day position and a reduced reflectivity night position, said actuator means including generally parallel pivot journal means and pivot shaft means for pivotally supporting said actuator means in said mirror case, said pivot journal means being a noncircular open-sided channel, extending across a width of said actuator means at a position spaced from said pivot shaft means; and
   said mirror case including support means for receiving said pivot shaft means and including cooperating pivot axle means corresponding to said pivot journal means for pivotally engaging said pivot journal means, said pivot axle means have a noncircular surface engaging said pivot journal means said surface being noncircular in cross section said pivot axle means being insertable and removable through said open side.

9. The assembly defined in claim 8 wherein said pivot journal means is a generally U-shaped open channel with first, second, and third surfaces; said first and second surfaces extending in the same general direction, away from said actuator means, from opposing edges of said third surface.

10. The assembly defined in claim 9 wherein said first and second surfaces are inclined inwardly toward one another, said inclined first and second surfaces being closer to one another at said third surface.

11. The assembly defined in claim 8 wherein said actuator means includes:
   a toggle member having first and second opposing edges, said pivot journal means extending along said first edge and a pivot surface being defined along at least a portion of said second edge; and
   a pivot lever adjacent said pivot surface; said pivot lever having first, second, and third sides, said first and second sides opposing one another and extending in the same general direction, away from said toggle member, from opposing ends of said third side; said pivot shaft means extending in generally opposing directions from each of said first and second sides; said pivot lever further having a pivot channel defined along at least a portion of said third side, said pivot channel being adapted to receive and to pivotally engage said pivot surface.

12. The assembly of claim 11 wherein said toggle member includes stop means for engaging a portion of said mirror case to position said mirror case and mirror element in each of said day position and said night position.

13. The assembly of claim 12 wherein said toggle member includes spring means for resiliently deflecting when said assembly is pivoted between day and night positions; said pivot surface being on said spring means.

14. The assembly of claim 13 wherein said toggle member also includes positioning means projecting generally parallel to said pivot journal channel for positioning said toggle member in said case.

15. A day/night rearview mirror assembly for vehicles comprises:
   a mirror case;
   a prismatic mirror element having nonparallel, generally planar front and back surfaces and supported and retained in said mirror case;
   actuator means mounted within said mirror case for shifting said mirror case and said mirror element between a predetermined reflectivity day position and a reduced reflectivity night position, said actuator means including generally parallel pivot journal means and pivot shaft means for pivotally supporting said actuator means in said mirror case, said pivot journal means being a noncircular open-sided channel, extending across a width of said actuator means at a position spaced from said pivot shaft means, said open-sided channel having two opposing sidewalls, said sidewalls tapering inward from said open side, said two opposing sidewalls being spaced farther from each other at said open side; and
   said mirror case including support means for receiving said pivot shaft means and including cooperating pivot axle means corresponding to said pivot journal means for pivotally engaging said pivot journal means, said pivot axle means having a surface engaging said pivot journal means, said surface being noncircular in cross section.

16. A day/night rearview mirror assembly for vehicles comprising:
   a mirror case having a back and a peripheral sidewall which define an interior space within said mirror case;
   a prismatic mirror element having nonparallel, generally planar, front and back surfaces, said mirror element being supported and retained in said mirror case and being spaced from said back of said mirror case;
   actuator means mounted in said mirror case within said interior space for shifting said mirror case and mirror element between a predetermined reflectivity day position and a reduced reflectivity night position, said actuator means including generally parallel pivot journal means and pivot shaft means for pivotally supporting said actuator means in said mirror case, said pivot journal means defining an open-sided channel extending across a width of said actuator means at a position spaced from said pivot shaft means;
   mounting means connected with said actuator means for mounting said mirror assembly to a vehicle;
   said mirror case including support means for receiving said pivot shaft means and including cooperating pivot axle means corresponding to said pivot journal means for pivotally engaging said pivot journal means; and at least one of said pivot axle means and said pivot journal means having a surface engaging the other of said pivot axle means and said, pivot journal means, said surface being noncircular in cross section.

17. The assembly defined in claim 16 wherein said pivot axle means has a first generally planar surface and a second generally planar surface.

18. The assembly defined in claim 17 wherein said pivot axle means further has a third surface; said first and second surfaces being generally parallel and extending in the same general direction, away from said actuator means, from opposing edges of said third surface.

19. The assembly defined in claim 18 wherein said back of said mirror case has a mounting aperture defined therein and wherein said mounting means extends from said actuator means, through said mounting aperture, and out of said case.

20. The assembly defined in claim 19 wherein said mounting aperture has a top edge and said top edge defines said pivot axle means.

21. The assembly of claim 16 wherein said actuator means includes stop means for engaging a portion of said case to position said case and mirror element.

22. A day/night rearview mirror assembly for vehicles comprising:

a mirror case having a back and a peripheral sidewall which define an interior space within said mirror case, said back of said mirror case having a mounting aperture defined therein;

a prismatic mirror element having nonparallel, generally planar, front and back surfaces, said mirror element being supported and retained in said mirror case and being spaced from said back of said mirror case;

actuator means mounted in said mirror case within said interior space for shifting said mirror case and mirror element between a predetermined reflectivity day position and a reduced reflectivity night position, said actuator means including generally parallel pivot journal means and pivot shaft means for pivotally supporting said actuator means in said mirror case, said pivot journal means being a noncircular open-sided channel extending across a width of said actuator means at a position spaced from said pivot shaft means, said pivot axle means having a first generally planar surface, having a second generally planar surface, and having a third surface, said first and second surfaces being generally parallel and extending in the same general direction, away from said actuator means, from opposing edges of said third surface; and mounting means connected with said actuator means for mounting said mirror assembly to a vehicle, said mounting means extending from said actuator means, through said mounting aperture, and out of said case;

said mirror case including support means for receiving said pivot shaft means and including cooperating pivot axle means corresponding to said pivot journal means for pivotally engaging said pivot journal means, said mounting aperture having a top edge which defines said pivot axle means, said pivot axle means being insertable and removable through said open side.

23. The assembly defined in claim 22 wherein said pivot journal means is a generally U-shaped open channel with fourth, fifth, and sixth surfaces; said fourth and fifth surfaces extending in the same general direction, away from said actuator means, from opposing edges of said sixth surface.

24. The assembly defined in claim 23 wherein said fourth and fifth surfaces of said U-shaped open channel are inclined inwardly toward one another, said inclined fourth and fifth surfaces being closer to one another at said sixth surface.

25. A day/night rearview mirror assembly for vehicles comprising:

a mirror case having a back and a peripheral sidewall which define an interior space within said mirror case;

a prismatic mirror element having nonparallel, generally planar, front and back surfaces, said mirror element being supported and retained in said mirror case and being spaced from said back of said mirror case;

actuator means mounted in said mirror case within said interior space for shifting said mirror case and mirror element between a predetermined reflectivity day position and a reduced reflectivity night position, said actuator means including generally parallel pivot journal means and pivot shaft means for pivotally supporting said actuator means in said mirror case, said pivot journal means extending across a width of said actuator means at a position spaced from said pivot shaft means, including a toggle member having first and second opposing sides, said pivot journal means extending along said first side and a pivot surface being defined along at least a portion of said second side and including a pivot lever adjacent said pivot surface; said pivot lever having first, second, and third sides, said first and second sides opposing one another and extending in the same general direction, away from said toggle member, from opposing ends of said third side; said pivot shaft means extending in generally opposing directions from each of said first and second sides; said pivot lever further having a pivot channel defined along at least a portion of said third side, said pivot channel being adapted to receive and to pivotally engage said pivot surface;

mounting means connected with said actuator means for mounting said mirror assembly to a vehicle;

said mirror case including support means for receiving said pivot shaft means and including cooperating pivot axle means corresponding to said pivot journal means for pivotally engaging said pivot journal means; and at least one of said pivot axle means and said pivot journal means having a surface engaging the other of said pivot axle means and said pivot journal means, said surface being noncircular in cross section.

26. The assembly of claim 25 wherein said toggle member includes stop means for engaging a portion of said mirror case to position said mirror case and mirror element in each of said day position and said night position.

27. The assembly of claim 26 wherein said toggle member includes spring means for resiliently deflecting when said assembly is pivoted between day and night positions; said pivot surface being on said spring means.

28. The assembly of claim 27 wherein said toggle member also includes positioning means projecting generally parallel to said pivot journal channel for positioning said toggle member in said case.

29. A da/night rearview mirror assembly for vehicles comprising:

a mirror case;

a prismatic mirror element having nonparallel, generally planar front and back surfaces, said element being supported and retained in said mirror case;

actuator means mounted within said mirror case for shifting said mirror case and mirror element between a predetermined reflectivity day position and a reduced reflectivity night position; said actuator means including a toggle member, said toggle member having a first side facing in one direction, a second side facing in a second direction and spaced from said first side, and an open-sided pivot journal defined along at least a portion of said first side of said toggle member, said toggle member further having a pivot surface defined along at least a portion of said second side, said pivot journal opening away from said pivot surface; said actuator means also including a pivot lever, said pivot lever having pivot shaft means for pivotally mounting said pivot lever in said mirror case and having a pivot channel for receiving and pivotally engaging said pivot surface; and said mirror case including support means for receiving said pivot shaft means and further including a pivot axle corresponding to said pivot journal for receiving and pivotally engaging said pivot journal, said pivot journal having a noncircular surface engaging said pivot axle.

30. The assembly defined in claim 29 wherein said pivot axle is also noncircular.

31. The assembly defined in claim 30 wherein said pivot axle has at least two generally planar surfaces and each said surface has opposing longitudinal edges.

32. The assembly defined in claim 31 wherein said pivot axle has first, second, and third surfaces; said first and second surfaces being generally parallel and extending in the same general direction, away from said actuator means, from opposing edges of said third surface.

33. The assembly defined in claim 32 further including mounting means connected with said actuator means for mounting said mirror assembly to a vehicle and wherein said case has a back with a mounting aperture defined therein, said mounting means extending from said actuator means, through said mounting aperture, and out of said case.

34. The assembly defined in claim 33 wherein said mounting aperture has a top edge and said top edge defines said pivot axle means.

35. The assembly defined in claim 34 wherein said pivot journal is an open-sided channel and said pivot axle is insertable and removable through said open side.

36. The assembly defined in claim 35 wherein said pivot journal is a generally U-shaped open channel with fourth, fifth, and sixth surfaces; said fourth and fifth surfaces extending in the same general direction, away from said actuator means, from opposing edges of said sixth surface.

37. The assembly defined in claim 36 wherein said fourth and fifth surfaces of said U-shaped open channel are inclined inwardly toward one another, said inclined fourth and fifth surfaces being closer to one another at said sixth surface.

38. The assembly defined in claim 29 wherein said pivot axle is insertable and removable through said open side of said pivot journal.

39. The assembly defined in claim 38 wherein said pivot journal has first, second, and third surfaces; said first and second surfaces extending in the same general direction, away from said actuator means, from opposing edges of said third surface.

40. The assembly of claim 29 wherein said toggle member includes stop means for engaging a portion of said mirror case to position said mirror case and mirror element in each of said day position and said night position.

41. The assembly of claim 40 wherein said toggle member includes spring means for resiliently deflecting when said assembly is pivoted between day and night positions; said pivot surface being on said spring means.

42. A day/night rearview mirror assembly for vehicles comprising:

a mirror case;

a prismatic mirror element having nonparallel, generally planar front and back surfaces and supported and retained in said mirror case;

actuator means mounted within said mirror case for shifting said mirror case and mirror element between a predetermined reflectivity day position and a reduced reflectivity night position, said actuator means including generally parallel pivot journal means and pivot shaft means for pivotally supporting said actuator means in said mirror case, said pivot journal means extending across a width of said actuator means at a position spaced from said pivot shaft means; and said mirror case including support means for receiving said pivot shaft means and including cooperating pivot axle means corresponding to said pivot journal means for pivotally engaging said pivot journal means, said pivot axle means having a first generally planar surface, having a second generally planar surface, and having a third surface, said first and second surfaces being generally parallel and extending in the same general direction from opposing edges of said third surface and away from said actuator means.

* * * * *

UNITED STATES PATENT AND TRADEMARK OFFICE
CERTIFICATE OF CORRECTION

PATENT NO. : 5,327,288
DATED : July 5, 1994
INVENTOR(S) : James M. Wellington et. al.

It is certified that error appears in the above-indentified patent and that said Letters Patent is hereby corrected as shown below:

Column 4, line 46

After "lock" delete --15--.

Column 7, lines 37 & 38

After "have a" delete --noncircular--.

Column 8, line 15, claim 15

"comprises" should be --comprising--.

Column 11, line 5, claim 29

"da/night" should be --day/night--.

Signed and Sealed this

Seventeenth Day of January, 1995

BRUCE LEHMAN

*Attest:*

*Attesting Officer*　　*Commissioner of Patents and Trademarks*